United States Patent [19]

Stribiak

[11] Patent Number: 4,811,843
[45] Date of Patent: Mar. 14, 1989

[54] PROTECTIVE DEPLOYMENT APPARATUS FOR ROTARY CUTTING TOOLS

[75] Inventor: John J. Stribiak, Homewood, Ill.

[73] Assignee: Precision Carbide Tool Co., Inc., Niles, Ill.

[21] Appl. No.: 156,296

[22] Filed: Feb. 16, 1988

[51] Int. Cl.$^4$ .............................................. B65D 85/24
[52] U.S. Cl. ................... 206/349; 134/201; 206/379; 211/69; 408/241 R
[58] Field of Search ................... 76/38; 134/138, 201; 206/349, 379; 211/69; 279/1 L, 1 ME, 20, 46 R; 408/22, 50, 52, 69, 116–118, 146, 186, 187, 198, 241 G, 241 R, 238, 239, 204; 409/134

[56] References Cited

U.S. PATENT DOCUMENTS

| | | | |
|---|---|---|---|
| 3,970,407 | 7/1976 | Uffman | 408/204 |
| 3,973,863 | 8/1976 | Smith | 211/69 |
| 4,253,830 | 3/1981 | Kazen et al. | 206/379 |
| 4,413,731 | 11/1983 | Weideman | 206/379 |
| 4,674,927 | 6/1987 | Khurana | 409/134 |
| 4,725,064 | 2/1988 | Glimpel et al. | 279/46 R |
| 4,761,876 | 8/1988 | Kosmowski | 206/379 |

FOREIGN PATENT DOCUMENTS

| | | | |
|---|---|---|---|
| 1329721 | 5/1963 | France | 408/241 R |
| 0003481 | 2/1910 | United Kingdom | 408/204 |
| 0574285 | 12/1945 | United Kingdom | 408/241 G |

*Primary Examiner*—Jimmy G. Foster
*Attorney, Agent, or Firm*—Dick and Harris

[57] ABSTRACT

A protective deployment apparatus for guarding the cutting regions of a rotary cutting tool against damage, wear and injury to users, which could be caused by such a cutting tool during packaging, transporting, handling, storing, and installation into conventional tool holding and processing implements. An apparatus housing includes a gripping region for securing the conventional gripping collar which is affixed around a rotary cutting tool, so as to facilitate insertion and retraction of the tool between tool holding implements and the apparatus itself. The gripping region maintains the rotary cutting tool in a centered aligned position with respect to the longitudinal axis of the apparatus, while at the same time, keeping the entire cutting portion of the tool isolated within the confines of the apparatus housing itself, while in the retracted position. Such secured alignment precludes inadvertent contact of the cutting portion of the tool with external objects, and with the interior wall of the housing, as well as with the interior walls of conventional tool holding implements. The tool protecting apparatus can be easily removed from conventional gripping elements after insertion, leaving the shank and cutting portions of the tool exposed for further use and/or processing. The apparatus can additionally be re-utilized to mechanically, and safely, retrieve and reposition the tool back into its retracted isolated position within the housing, without risk of injury to the operator, and without risk of damage to the tool itself.

21 Claims, 3 Drawing Sheets

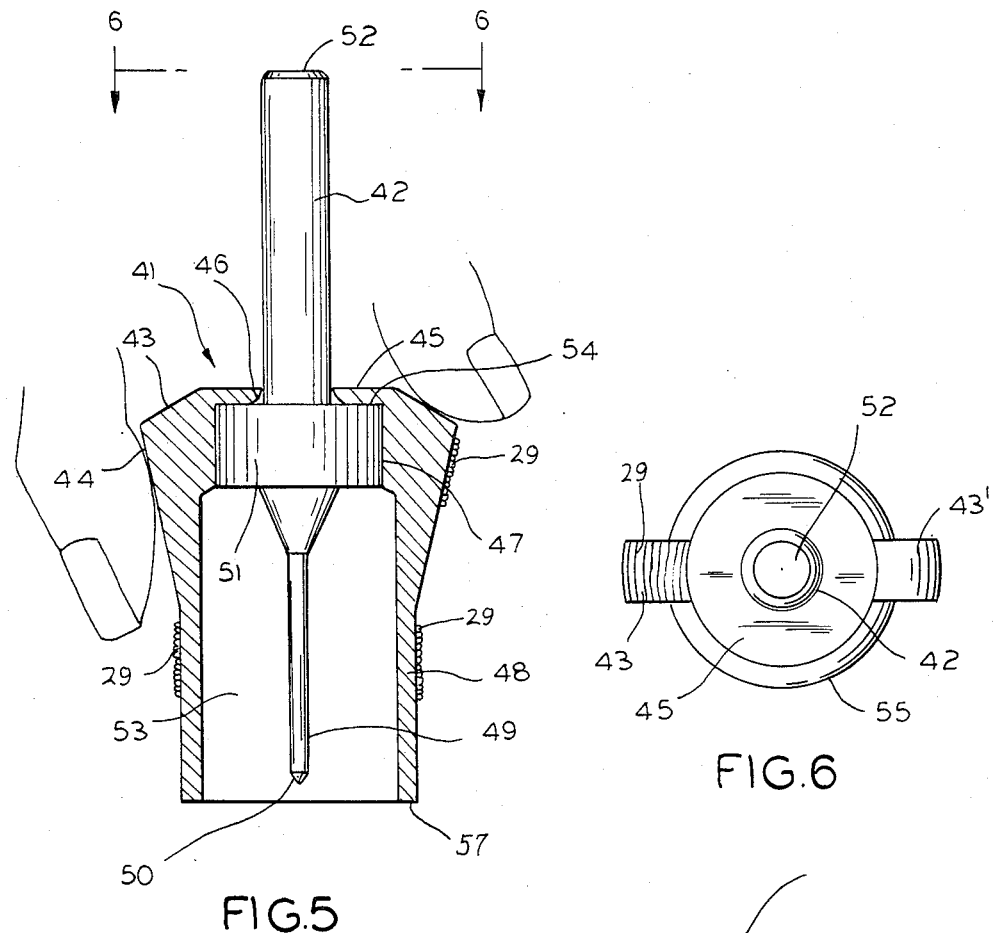
FIG.5
FIG.6
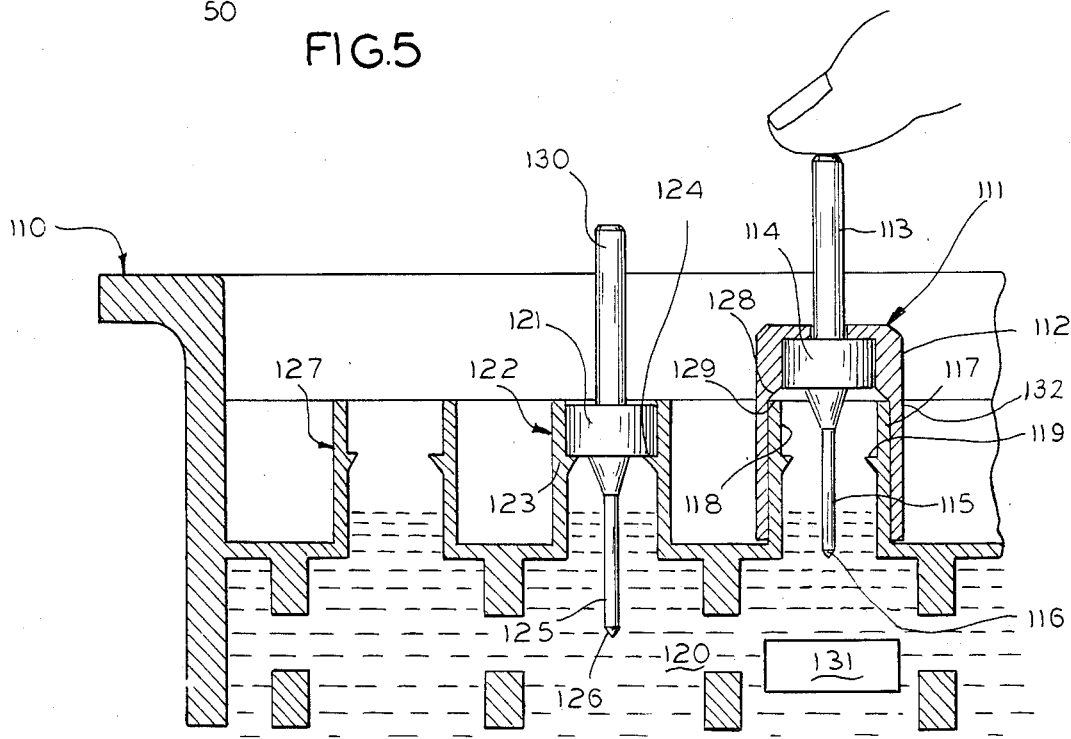
FIG.13

PROTECTIVE DEPLOYMENT APPARATUS FOR ROTARY CUTTING TOOLS

BACKGROUND OF THE INVENTION

The present invention relates in general to tool protection apparatuses and, in particular, to a protective deployment apparatus which slidably secures a rotary cutting tool's gripping collar, to guard the cutting portion of a rotary cutting tool, thereby avoiding excessive abuse and damage thereto. The invention is further used as an alignment aid when transferring a conventional rotary cutting tool into a conventional tool gripping element, among other things.

For many years, industry has utilized tool gripping elements for manually receiving and centering a gripping collar, which is affixed around a rotary cutting tool. While several of such tool gripping elements have typically provided for acceptance of such a gripping collar by having an operator physically manipulate the rotary cutting tool into position, few, if any, have been used in association with a protective reciprocating jacket. In spite of the existence and use of conventional tool gripping elements in the trade, few if any, prior art devices utilize a protective deployment apparatus in cooperation with such gripping elements, let alone one that permits reciprocating insertion and withdrawal of the gripping collar, and in turn, a rotary cutting tool into and from such gripping elements.

It is thus an object of the present invention to provide a protective deployment apparatus which can be used in reciprocating cooperation with conventional gripping elements to effectively align, while isolating and protecting, the cutting portion of a rotary cutting tool, during manual insertion into a tool gripping element.

Another object of the present invention is to provide a protective deployment apparatus which can reciprocably cooperate with gripping elements in machine tool processing equipment, such as an ultrasonic tool cleaner, for effective and safe insertion and removal of a rotary cutting tool.

It is further an object of the present invention to provide such damage free retraction of a rotary cutting tool into such tool gripping elements, for use in machine tools and tool processing equipment, while permitting realignment and secure repositioning of the tool back into the protective deployment apparatus, for further protective storage and handling when such a tool is not in use.

It is additionally an object of the present invention to provide a protective deployment apparatus which is ergonomically designed so as to facilitate ease during manual manipulation of the apparatus in association with its deployment of such cutting tools.

These and other objects of the invention will become apparent in light of the present specification and drawings.

SUMMARY OF THE INVENTION

The present invention comprises a protective deployment apparatus for rotary cutting tools of the type having shank and cutting portions for housing and shielding the cutting portion of such cutting tools during shipment and storage, while at the same time facilitating the deployment, installation and removal of such a rotary cutting tool housed within the apparatus, into conventional gripping elements of machine tool and rotary cutting tool processing equipment. The protective deployment apparatus cooperates to alternatively grip and release the rotary cutting tool through cooperation with the conventional gripping collar member typically and radially deployed about the shank portion of the rotary cutting tool itself.

The protective deployment apparatus includes substantially cylindrically shaped tool housing means having a first end and a second end opposite to the first end, for enclosing the cutting portion of the rotary cutting tool when the tool is in a first retracted position. Tool collar gripping means are operably positioned within this tool housing for restrainably and releasably fixing the position of the gripping collar member and, in turn, the rotary cutting tool affixed therewithin in position within the tool housing means in that first retracted position. Shank exposure means are positioned at the first end of the tool housing means for exposing the emanating shank portion of the cutting tool. These shank exposure means cooperate with the tool collar gripping means to permit the shank portion, and again, the rotary cutting tool, to be collectively and operably reciprocated between the first retracted position and the second extended position, in which the cutting portion of the cutting tool passes through and out of the second end of the tool housing, with the gripping collar member being released from fixation within the tool collar gripping means for alternative grasping by the conventional gripping elements. The tool collar gripping means serve to align the gripping collar with the conventional gripping elements of the machine tool or rotary cutting tool processing equipment, while the cutting tool is in its first retracted position, so as to enable release of the gripping collar from the tool housing means upon reciprocation of the rotary cutting tool into its second extended position to, in turn, enable restrained receipt of the gripping collar by the conventional gripping elements, upon deployment of the rotary cutting tool to its fully extended position. Upon reciprocated transmittal to the conventional gripping elements, the gripping elements, the cutting tool, and the conventional gripping collar member positioned about the cutting tool, may be collectively utilized independently from the protective deployment apparatus in such machine tool and rotary cutting tool processing equipment.

In a preferred embodiment of the invention, the protective deployment apparatus further includes tool retrieving means for accepting and repositioning the gripping collar member and again, the attached rotary cutting tool, from its second extended position within the conventional gripping element, to regain its first retracted position within the substantially cylindrically shaped tool housing means. These retrieving means include the exposure of the shank portion of the rotary cutting tool beyond the shank exposure means while the cutting tool is in its second extended position, to enable alignment of the rotary cutting tool with the remainder of the tool housing means, and to further enable operable reciprocation of the gripping collar member, with its attached rotary cutting tool, between its second extended position and its first retracted position. During said reciprocation, the gripping collar member about the rotary cutting tool is released from the conventional gripping element slidably aligned with the tool collar gripping means within the tool housing means, and reciprocably retracted into the tool housing means to longitudinally isolate the cutting portion of the rotary cutting tool within the tool housing means.

In this preferred embodiment of the invention, the cylindrically shaped tool housing means is of a longitudinal length at least as long as the longitudinal length of that portion of the rotary cutting tool contained within the housing, while it is residing in its first retracted position, so as to longitudinally isolate the cutting portion therewithin from contact with other objects or users, when this tool is in its first retracted position.

In one embodiment of the invention, the tool collar gripping means comprises an anular flange region within the tool housing. This anular flange region includes an internal diameter approximately equal to the outer diameter of the gripping collar member so as to prompt an interference fit between the two when the rotary cutting tool is in its first retracted position. In another embodiment of the invention, the tool collar gripping means comprises a concentrically positioned plurality of ribs within the tool housing. This plurality of ribs describes an internal diameter approximately equal again, to the outer diameter of the gripping collar member so as to likewise prompt an interference fit between the rib members and the gripping collar member when the rotary cutting tool is in its first retracted position.

In this embodiment of the invention, in which rib members are utilized to comprise the tool collar gripping means, at least one or more of the rib members include corresponding prompting means operably positioned at their lower tips, for facilitating the secured alignment as well as the alternative release and grasping of the gripping collar member and, in turn, the rotary cutting tool, by the tool collar gripping means from and into the first retracted position in which the cutting portion of the rotary cutting tool is isolated by the tool housing means These prompting means in the one or more rib members, operably expand the conventional gripping elements upon operable engagement of the protective deployment apparatus with the conventional gripping elements, to facilitate passage of the gripping collar member into and out of the conventional gripping elements. In converse fashion, the prompting means permit the contraction of the gripping elements upon disengagement of the protective deployment apparatus from the conventional gripping elements. In this embodiment, the conventional gripping elements would typically comprise conventional tanged gripping members. The prompting means in the one or more rib members include a chamfered lower edge capable of prompting respectively aligned ones of said tanged gripping members, radially outwardly as the protective deployment apparatus is operably engaged with the conventional gripping elements. Likewise, the chamfered lower edge enables the release of the respectively aligned tang gripping members to permit the overall conventional gripping elements to contract radially inwardly upon disengagement between the protective deployment apparatus and the gripping elements.

Accordingly, the present invention is capable of cooperating with conventional gripping elements of the type utilizing a cylindrical grip member, alone, or with a plurality of alternatively expandable and contractible tang means, for facilitated and alternative receipt and release of the gripping collar member upon reciprocation of the rotary cutting tool (with its attached gripping collar member), between its second extended and first retracted positions, respectively.

In one embodiment of the invention, the rotary cutting tool processing equipment comprises rotary cutting tool reconditioning means for sharpening and/or otherwise altering at least some of the cutting portion of the rotary cutting tool. In yet another embodiment, the rotary cutting tool processing equipment comprises an ultrasonic cleaning apparatus for cleaning at least some of the cutting portion of the rotary cutting tool.

In the preferred embodiment of the invention, the protective deployment apparatus further includes pressure application surfaces which are operably positioned to emanate outwardly from the outer periphery of the top surface at the first end of the tool housing means. These pressure application surfaces facilitate vertical engagement and restraint of the protective deployment apparatus relative to the conventional gripping elements prior to and during reciprocation of the rotary cutting tool, between its first retracted position and second extended position. Preferably, these pressure application surface means comprise obliquely angled pressure regions positioned relative to the top surface of the tool housing, to lend ease in asserting manual pressure to the overall protective deployment apparatus. Furthermore, these obliquely angled pressure regions are contemplated as being further embossed with tactile gripping edges.

The preferred embodiment of the invention further includes utilization of pullback means operably secured to the outer periphery of the tool housing means, to further facilitate the vertical removal and release of the protective deployment apparatus from the conventional gripping elements. Preferably, these pullback means comprise obliquely angled pullback regions, positioned relative to the longitudinal walls of the tool housing to again impart ease in applying manual pressure to the apparatus as it is pulled upwardly away from the conventional gripping elements. Likewise, these obliquely angled pullback regions may be further embossed with tactile gripping ridges.

In yet another embodiment of the invention, knurling means are operably positioned about the outer periphery of the longitudinal walls of the substantially cylindrically shaped tool housing means again, to impart facilitated manual manipulation and restraint of same.

These longitudinal walls may additionally be flared outwardly proximate to the second end of the tool housing means, to facilitate engagement of same with the conventional gripping elements.

In the preferred embodiment of the invention, the shank exposure means further include a chamfered edge positioned therebelow, to facilitate the slidable positioning of the top of the shank of the rotary cutting tool passing through the shank exposure means.

In yet another embodiment of the invention, the protective deployment apparatus further includes indicia means operably and visibly applied to the longitudinal walls of the tool housing means, to facilitate the identification of the structural specifications of the rotary cutting tool contained therewithin.

BRIEF DESCRIPTION OF THE DRAWINGS

FIG. 5 of the drawings is an elevated cross-sectional front view of another embodiment of applicant's invention, in which the rotary cutting tool and associated gripping collar is operably positioned for protective isolation within the protective deployment apparatus, and held in place in a first retracted position prior to reciprocated insertion into a separate gripping element;

FIG. 6 of the drawings is a top plan view of the protective deployment apparatus of FIG. 5, particularly revealing the top external pressure application surfaces of the apparatus for mechanically restraining the protective deployment apparatus from movement during recriprocation of the rotary cutting tool from an aligned conventional gripping element back into the apparatus hosing, through retraction of the cutting tool shank portion;

FIG. 13 of the drawings is an elevated cross-sectional front view showing the protective deployment apparatus in cooperation with the gripping elements of a tool processing device, here comprising a tool cleaning apparatus.

DETAILED DESCRIPTION OF THE DRAWINGS

Figure 1:
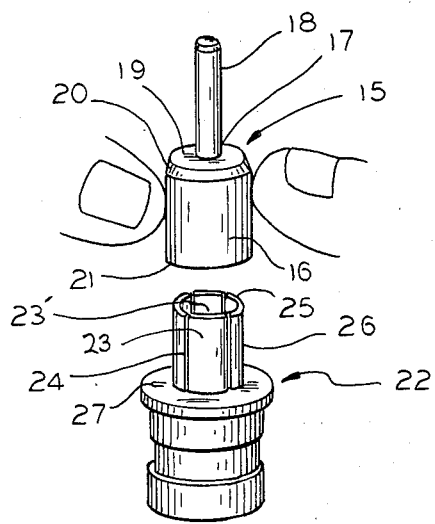
FIG. 1 of the drawings is a perspective view of the protective deployment apparatus, prior to alignment and operable positioning with a conventional gripping element, and showing in particular the extended position of the exposed shank portion of the rotary cutting tool enclosed within the apparatus, when located in its fully recessed, retracted position within the protective deployment apparatus.

While this invention is susceptible of embodiment in many different forms, there is shown in the drawings and will herein be described in detail, several specific embodiments with the understanding that the present disclosure is to be considered as an exemplification of the principals of the invention and is not intended to limit the invention to the embodiments illustrated.

Rotary cutting tool protective deployment apparatus 15 is shown in FIG. 1 as including apparatus housing means 16, in which rotary cutting tool 18, as well as conventional gripping collar 39 is slidably received, with its shank portion exposed through aperture 17 in the top, first end, of apparatus housing means 16. Top surface 19 of housing 16 is shown as having a beveled surface 20 so as to reduce sharp edges when for example, the apparatus is braced prior to pushing tool 18 downwardly at its shank portion. Conventional gripping element 22, which cooperates upon alignment with deployment apparatus 15, includes top surface 27 which, during reciprocation of the tool 18, abuts at or near bottom surface (second end) 21 of apparatus housing 16, as also shown in FIG. 1, as well as FIG. 2, together with gripping tangs 23 and 26 and tang top 25. Spaces, such as space 24, between gripping tangs, such as tangs 23 and 26, allow for expansion of overall conventional gripping element 22 when gripping collar means 39, which is secured around lower end of the shank portion of rotary cutting tool 18, (as also shown in FIG. 3), is slid into aperture 23' of conventional gripping element 22, as shown in FIG. 4 where cutting tool 18 is in its fully extended position so as to be grasped by gripping element 22 and released from apparatus 15.

Figure 2:
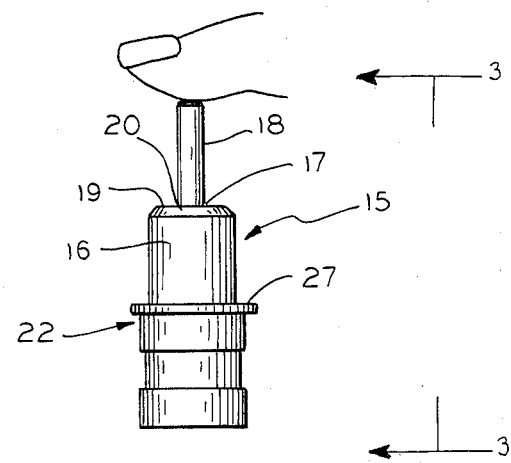
FIG. 2 of the drawings is an elevated side view of the protective deployment apparatus for rotary cutting tools, showing the substantially cylindrical housing means operably and restrainably enclosing the tool, in operable aligned positioning with a conventional gripping element for subsequent use of the cutting tool-gripping element in automated machine tool and/or tool processing equipment.

Protective deployment apparatus 15 is shown in FIG. 2, with apparatus housing 16 seated upon top surface 27 of conventional gripping apparatus 22, so as to facilitate proper positioning of conventional gripping apparatus 22, to receive, through reciprocation out of apparatus 15, rotary cutting tool 18. Reciprocation of rotary cutting tool 18 into the conventional gripping means 22, as shown in FIG. 2, is achieved by applying pressure upon the top surface of the shank of rotary cutting tool 18, so as to force same through aperture 17 of apparatus housing 16 until the entirety of gripping collar 39, has been appropriately positioned within the tangs, such as tangs 23 and 26, while gripping element 22 is aligned with housing 16. Rotary cutting tool 18 can effectively and freely slide from apparatus 15 for retention within conventional gripping element 22 for further use of assembled tool 18—gripping element 22 in conventional, automatic load machine tools, for example, or other tool processing devices as desired. Apparatus 15 may further be utilized to extract rotary cutting tool 18 back from gripping element 22 upon completion of use for further storage, shipping, or successive alternate use of tool 18, as desired, where retraction is effected by again aligning housing 16 with element 22, and by pulling the shank portion of tool 18 up through aperture 17, until gripping means 32 grasps collar 39 about tool 18. Rotary cutting tool 18 can thus be mechanically repositioned within protective deployment apparatus 15, again, without exposing its cutting portions to foreign surfaces—thereby avoiding risk of damage caused by inadvertent contacts with elements 22 etc., as well as avoiding injury from human contact with, for example, the sharp point of rotary cutting tool 18.

Risk of injury in using the invention is further avoided during mechanical replacement of rotary cutting tool 18 back into protective deployment apparatus 15, by employment of beveled edge 20. When manually pulling shank portion of rotary cutting tool 18 back into its seated position, as shown in FIG. 3, pressure may be applied to top surface 19 of apparatus housing 16, simultaneously to the pulling of the shank portion. Beveled edge 20 thereby serves to eliminate sharp edges so as to reduce the risk of injury when such two-fold manual operation is applied.

Figure 3:
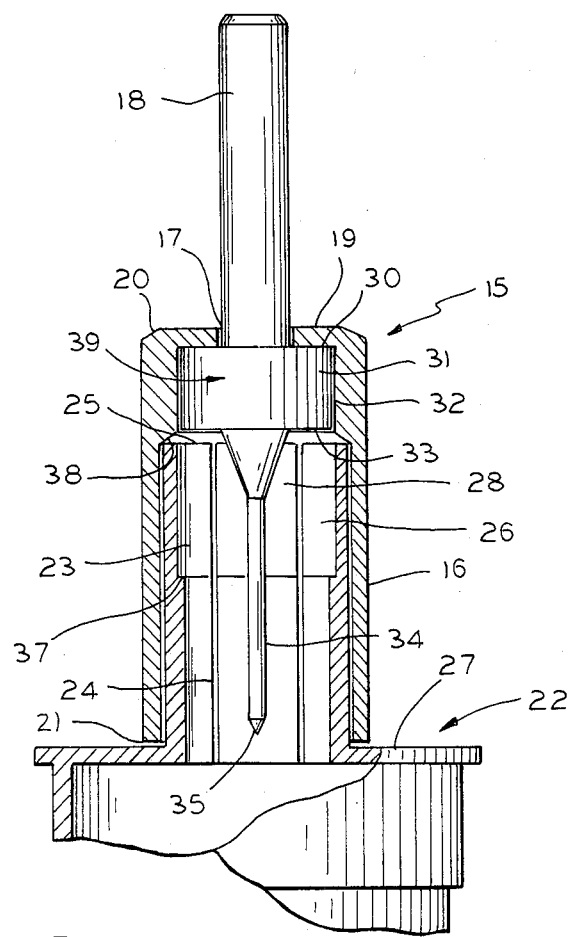
FIG. 3 of the drawings is an elevated cross-sectional view taken along lines 3—3 of FIG. 2 and looking in the direction of the arrows, showing the structural and operable relationship of the housed and isolated cutting tool and gripping collar elements therewithin, in cooperation with said conventional machine tool and/or tool processing gripping elements.
Figure 4:
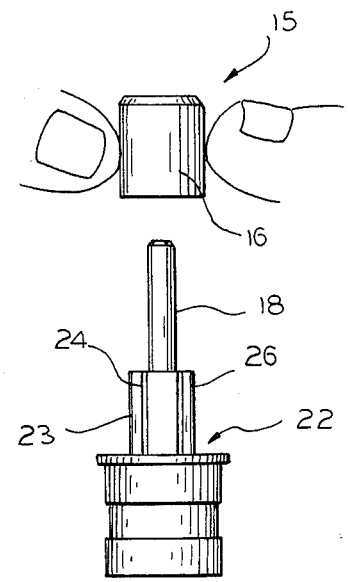
FIG. 4 of the drawings is an elevated side view of the embodiment of the protective deployment apparatus shown in FIGS. 1 through 3, in which the substantially cylindrical housing means has been separated from the rotary cutting tool, after the tool has been reciprocated between its retracted position within the apparatus, to its extended position therefrom, for insertion and receipt by the conventional gripping element.

Apparatus housing 16 of protective deployment apparatus 15 is also shown in operable cooperation with conventional gripping apparatus 22 in FIG. 3. Apparatus housing 16 has an inner diameter slightly larger than outer diameter of gripping tangs, such as tangs 23, 28, and 26, which have spaces such as space 24 between them, so as to enable slidable and aligned positioning of apparatus housing 16 immediately about gripping element 22. When apparatus housing 16 is fully engaged with conventional gripping element 22, bottom surface 21 of apparatus housing 16 substantially or nearly abuts top surface 27 of conventional gripping element 22, while top surface 25 of the gripping tangs, such as tangs 23 and 26, abut with the internal shoulder portion 38 within the upper region of apparatus housing means 16.

Aperture 17, centrally positioned at top housing surface 19, and which includes beveled edge 20, provides for exposure and slidable reciprocation of the shank portion of rotary cutting tool 18. Gripping collar 39, concentrically positioned, and conventionally secured around rotary cutting tool 18, is maintained in place in the retracted position within housing 16, with its top surface 30 abutting the internal top of apparatus housing 16. Such securement is made possible by matching the circumference of stamped gripping collar 39, with a diameter of gripping means 32, to describe an interference fit therebetween. When in its fully grasped (retracted) position, bottom surface 33 of gripping collar 39 is isolated from contact with top surface 25 of the gripping tang means, such as tang 23, when apparatus housing 16 is properly positioned in alignment over gripping element 22. When seated in this position, cutting portion 34 of rotary cutting tool 18, as well as its cutting tip 35, do not extend beyond secured surface (bottom) 21 of apparatus housing 16 so as to be safely shielded therewithin.

Upon reciprocating rotary cutting tool 18 into gripping element 22, shank portion of tool 18 will remain exposed beyond top surface of tang 25 of gripping element 22, so as to enable operable use of the combined tool-gripping element pair within a conventional machine tool apparatus, as well as for reinsertion and pulling back into protective deployment apparatus 15 itself. Rotary cutting tool 18 is prevented from being located too deeply within gripping element 22 by conventional retention flanges 37 in such standard gripping elements, so as to render effective external cooperation with such tool machines or tool processors. Restraining portion 37 has a diameter substantially smaller than gripping collar 39, so as to preclude the inadvertent reciprocation of same beyond that point in its extended position.

Rotary cutting tool 18 is shown in FIG. 4 fully engaged within gripping tangs, such as tangs 23 and 26. Gripping collar 39, has been maintained, centered, and secured between the gripping tangs as the result of slight expansion of the tangs so as to allow for widened acceptance and interference fit of the gripping collar 39. Accordingly, protective deployment apparatus 15 can be readily slipped from position over the remaining exposed shank portion of rotary cutting tool 18. Rotary cutting tool 18 is thus effectively positioned within gripping element 22 as the result of gripping collar 39 being firmly seated within the gripping tangs.

Another embodiment of the invention utilizing external pressure positions for manual deployment, is shown in FIG. 5. Oblique pressure flanges 43, and grasping portions 44 facilitate applying pressure downwardly and upwardly, respectively, to apparatus housing 48 to, in turn, facilitate deployment of the tool from its retracted to extended positions and vice versa. Pressure application surface 43 is obliquely angled to top surface 45 of apparatus housing 48 for ergonomic advantages when manual pressure is applied downwardly to apparatus housing 48.

Rotary cutting tool 52 is slidably positioned within internal cavity 53 of apparatus housing 48, through positioning of its shank through aperture 46 which is centrally located along top surface 45. Shank portion 42 of rotary cutting tool 52 preferably has a diameter slightly smaller than aperture 46 so as to permit free sliding of the shank within aperture 46. Likewise, aperture 46 ensures that cutting portion 49 of rotary cutting tool 52 does not come into contact with the interior walls of apparatus housing 48, nor any other objects. Tool 52 is operably secured within apparatus housing 48, so as to facilitate protective deployment, storage, transportation, and handling of the tool without exposing any of its cutting portions 49, 50 beyond the bottom surface 57 of apparatus housing 48. Securement of the tool within apparatus housing 48 is affected through an interference fit between gripping collar 51 with gripping means 47 within cavity 53 of apparatus housing 48. Gripping collar 51, which is secured about lower periphery of shank portion 42 of rotary cutting tool 52, is firmly held against the ceiling 54 of internal cavity 53 as the result of the diameter of gripping means 47 being substantially equal in size to outer diameter of gripping collar 51. Protective deployment apparatus 41 is further shown in FIG. 6. with shank portion 42 of rotary cutting tool 52 centered within top surface 45 of apparatus housing 48. Pressure application surfaces 43 and 43', having oblique angles and knurling, if desired, emanate from outer periphery 55 at top surface 45 of apparatus housing 48. Knurling 29 is also shown in FIGS. 5 and 6, about housing 48, pressure application region 43 and pullback region 44, to improve tactile manipulation capabilities associated therewith.

Figure 7:
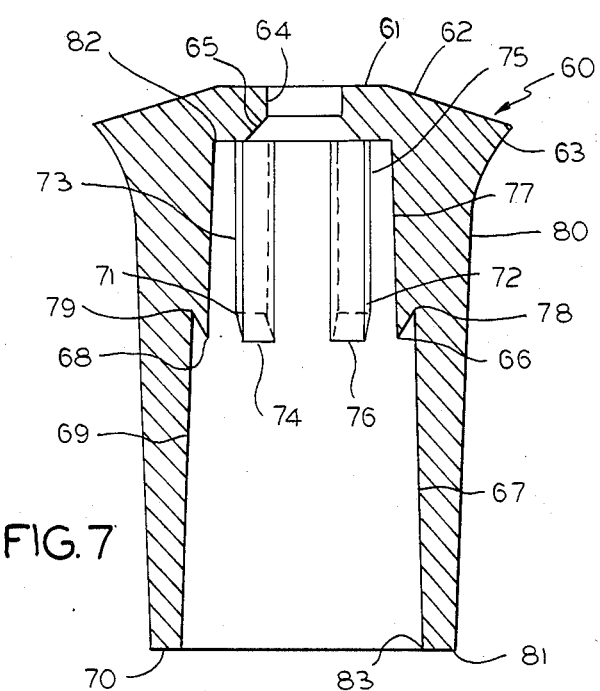
FIG. 7 of the drawings is an elevated front cross-sectional front view of the protective deployment apparatus, taken along lines 7—7 of FIG. 8 and looking in the direction of the arrows, showing another embodiment of the invention in which internal gripping ribs in the interior of the cylindrical housing means serve to center, align, as well as grasp the retaining collar positioned around the rotary cutting tool, and in which the gripping ribs are configured to operably facilitate retracted and extended reciprocation of the rotary cutting tool through radial expansion and contraction of the tangs of a conventional gripping element.
Figures 11, 12:
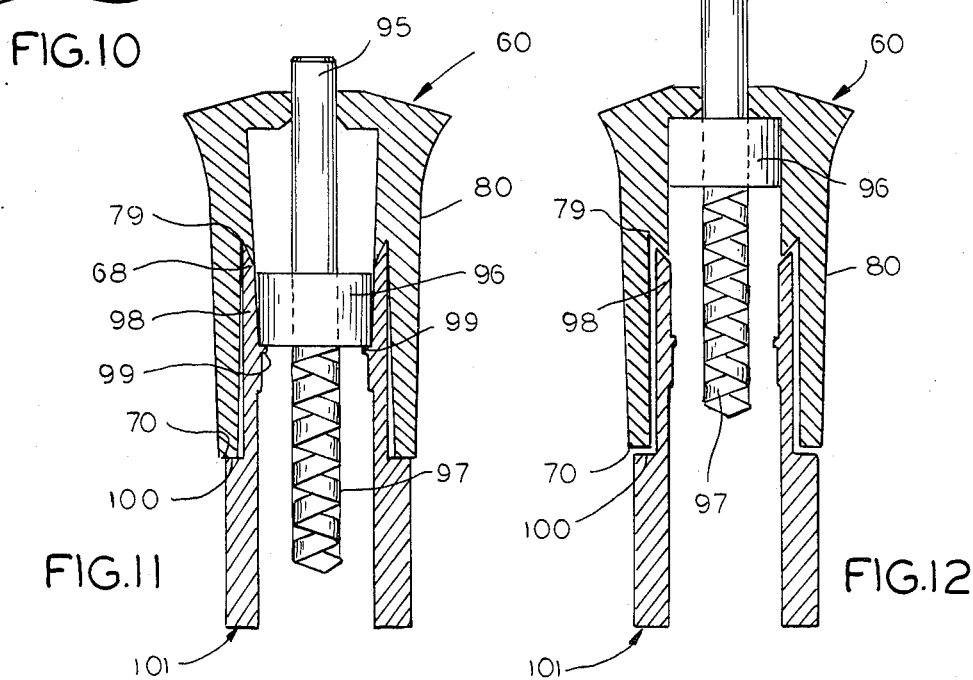
FIG. 11 of the drawings is an elevated cross-sectional front view of the protective deployment apparatus of FIG. 7, shown cooperating with conventional machine tool gripping elements while the rotary cutting tool itself is in its extended position, in which the rotary cutting tool has been fully and restrainably accepted by the expanded gripping tangs of the conventional gripping element.
FIG. 12 of the drawings is an elevated cross-sectional view of the protective deployment apparatus, showing, in particular, the operable placement of the gripping collar member of the rotary cutting tool, within the substantially circular housing means, both after (upon retraction), and prior (before extension), respectively from and to restrained acceptance of same by the gripping tangs of conventional gripping elements, and further showing contraction of the gripping tangs when not expanded by the prompting elements of the plurality of gripping ribs positioned within the apparatus housing.

Another embodiment of the invention, one in which chamfered ribbed gripping means 71, 72 are utilized, is shown in FIG. 7. Apparatus housing 80 is shown with top surface 61 having a centrally positioned aperture shank exposure 64, for slidable positioning of the shank of rotary cutting tool 95, as shown in FIG. 11. Flanged internal wall 65 of aperture 64 enables easy locating of the shank portion of rotary cutting tool 95 upon insertion thereinto, as shown in FIG. 11. Aperture 64 has a diameter only slightly greater than the diameter of shank portion of rotary cutting tool 95, so as to further ensure that cutting portions 97 of tool 95 do not come into contact with the internal walls 67, 69 of apparatus housing 80. Pressure application surface 62 and flanged grasping portion 63, each having oblique angles, provide means to mechanically restrain or remove protective deployment apparatus 60 from conventional gripping element 101, as shown in FIGS. 11 and 12. Bottom surface 70 at the second end of apparatus housing 80 has inner tapered wall 83 and lower outer tapered wall 81 to facilitate ease in cooperating with conventional gripping element 101. The inner cavity of apparatus housing 80 includes chamfered ribs as gripping means, such as ribs 71 and 72, positioned about the inner periphery of apparatus housing 80. Ribs, 71 and 72, have outer walls, such as 73 and 75, respectively, which abut with the inner wall of apparatus housing 80, and have inner walls, such as wall 77, which abut with gripping collar 96 when rotary cutting tool 95 is in its seated retracted position within apparatus housing 80, as shown in FIG. 12. This configured plurality of ribs, such as ribs 71 and 72, form griping means having a diameter substantially equal to the outer diameter of gripping collar 96 for an interference fit between same. Ribs 71 and 72 have chamfered portions at their bottom ends, such as chamfers 78 and 79, so that the rib ends, such as rib ends 68, 66, 74 and 76, are distanced away from inner tapered walls 67 and 69 for expanding the resilient end portions of tangs, such as tang 68, when engaging same. Accordingly, collar 96, as shown in FIG. 12 can be slidably yet restrainably positioned within ribs, such as ribs 71 and 72. Gripping collar 96, as shown in FIG. 11 and 12, remains seated within apparatus housing 80, where its top surface abuts ceiling 82 of internal cavity of apparatus housing 80, so that the entire cutting portion 97 of rotary cutting tool 95 is positioned isolated above bottom surface 70 of apparatus housing 80, as shown in FIG. 12.

Figure 8:
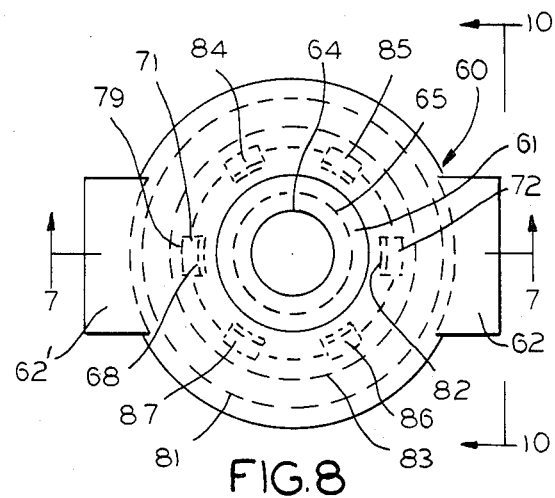
FIG. 8 of the drawings is a top plan view of the protective deployment apparatus of FIG. 7, partially in phantom, particularly showing the concentric positioning of the internal gripping ribs within the substantially cylindrical apparatus housing means.

FIG. 8 shows protective deployment apparatus 60 with the tapered walls of apparatus housing 80, with the pressure application surfaces 62 and 62' emanating from the outer periphery of top surface 61 of apparatus housing 80, and aperture 64, shown centrically positioned between the tops of ribs 71, 72, 84, 85, 86 and 87, to ensure centering of rotary cutting tool 95. Each of these ribs preferably has a chamfered end to cooperate with respective tang ends, to expand the diameter of the associated gripping element 101 during extension of the tool, and permit contraction of same upon disconnection of the ribs and tangs, as shown in FIGS. 11 and 12—all to facilitate reciprocation of the tool from the grasps of apparatus gripping means to the grasp of the gripping element, and vice versa. Also shown in FIG. 8 are tapered interior wall 83 of apparatus housing 80, located at bottom surface 70, as well as outer tapered wall 81, also located at bottom surface 70 of apparatus housing 80, for easy cooperation with conventional gripping element 101.

Figure 9:
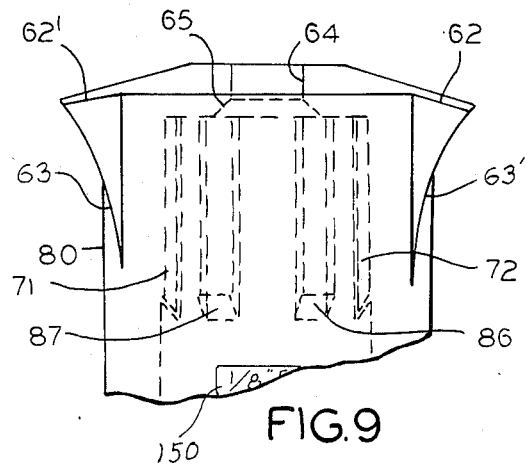
FIG. 9 of the drawings is an elevated partial front view of the protective deployment apparatus of FIG. 7, in partial phantom, further showing the chamfered configuration of the individual gripping ribs, as well as showing a plurality of pressure application surfaces at the top external and pullback means positioned at underlying surfaces of the apparatus housing.

Apparatus 60 is shown in FIG. 9 displaying the positions of ribs 71, 72, 86 and 87, internal chamfered exposure aperture 65 which emanates from aperture 64, and pressure application surfaces, 62 and 62'. Application surfaces 62 and 62' permit the application of mechanical force to the top of apparatus housing 80 while shank portion of rotary cutting tool 95 is extracted, vertically, until gripping collar 96 abuts with top internal wall 82 of apparatus housing 80. Apparatus housing 80 is additionally embossed with indicia means 150 for enabling visible reference to the structural specifications of rotary cutting tool 95, as shown in FIGS. 11 and 12.

Figure 10:
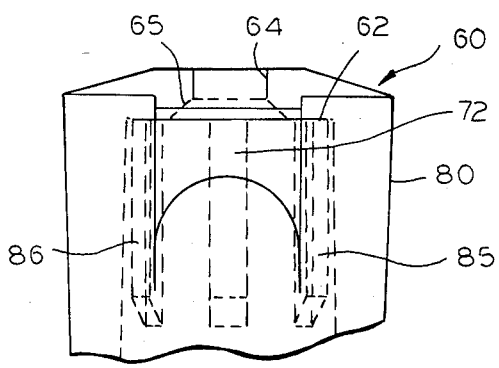
FIG. 10 of the drawings is an elevated partial side view of the protective deployment apparatus of FIG. 7, in partial phantom, particularly showing the positioning of the pressure application surfaces, as well as various portions of the internal gripping ribs.

Apparatus housing 80 of protective deployment apparatus 60 is also shown in FIG. 10 with ribs 72, 85 and 86 positioned within its interior. The tips of ribs, such as tips 74 and 76, are positioned away from internal wall 69, to cooperate with the gripping element tangs to facilitate alternative acceptance and release of gripping collar 96, as shown in FIGS. 11 and 12. Pressure application surface 62 is mechanically used when pulling shank portion of rotary cutting tool 95 through aperture 64.

Protective deployment apparatus 60 and conventional gripping apparatus 101 are shown in cross-section in FIGS. 11 and 12, in the tool extended and tool retracted positions, respectively. To enable gripping collar 96 of rotary cutting tool 95 to be fully accepted and grasped by conventional gripping element 101, its tangs, such as tangs 98, are expanded to a diameter somewhat larger than that of gripping collar 96, so as to facilitate secure placement of same prior to disconnection of apparatus 60. Rotary cutting tool 95 is precluded from being positioned too far into conventional gripping apparatus 101, by conventional internal seating ledge 99. Rotary cutting tool 95 can alternatively be removed from conventional gripping element 101 and repositioned back into apparatus housing 80 to isolate cutting portion 97 of tool 95. When apparatus housing 80 is cooperably seated upon conventional gripping means 101, the tips of the gripping tang 98 further cooperate with the chamfered portions of the ribs, such as rib 79 with lower tip 68, so as to provide an unobstructed path for gripping collar 96 to follow during reciprocation. Cutting portion 97 of rotary cutting tool 95 is protected from contact with other objects, as well as the internal walls of conventional gripping element 101, and the internal walls of apparatus housing 80, as a result of gripping collar 96 having an outer diameter substantially equal to the inner diameter of gripping tangs 98, as well as with respect to internal diameter of the ribs concentrically located within housing 80. As a result, gripping collar 96 acts as a centering guide when extending or retracting rotary cutting tool 95 into and from conventional gripping element 101 to apparatus housing 80.

As shown in FIG. 12, prior to extending rotary cutting tool 95 into conventional gripping element 101, apparatus housing 80 is lowered onto conventional gripping element 101 until bottom surface 70 of apparatus housing 80 abuts with shoulder portion 100 of the conventional gripping means 101. At the same time, the tips of gripping tangs 98 abut with the chamfered portion of rib 79. When force is applied to application surfaces 62 and 62', as shown in FIG. 9, gripping tangs 98 expand until their inner periphery is substantially aligned with the inner periphery of the ribs, such as ribs 74 and 76, as shown in FIG. 7. When this is achieved, pressure may be applied to the top of the shank of rotary cutting tool 95 so as to reciprocate it with its gripping collar 96, into conventional gripping means 101 until it is seated upon seating ledge 99. At that time, protective deployment apparatus 80 can be mechanically removed from about the remaining exposed shank of rotary cutting tool 95 through vertical withdrawal of the apparatus.

One embodiment of the invention, showing use of the invention with further tool processing means, namely a tool cleaner device (or alternatively, a tool sharpener or pointer), is shown in FIG. 13 where protective deployment apparatus 111 cooperates with cleaning apparatus 110 to clean tool 113. Apparatus housing 112, through gripping collar 114, is secured about rotary cutting tool 113 which is appropriately seated, positioned and restrained, at top internal portion of apparatus housing 112. Apparatus 111 is mechanically placed over external walls of gripping element 117 adjacent other cleaning gripping elements 122 and 127, in cleaning tank 110. Apparatus housing 112 may be completely seated upon receiving gripping element exterior 132 to prompt the lower corner of chamfered internal shoulder 128 to abut with top surface 129 of gripping element 117. Rotary cutting tool 113 is mechanically extended downwardly within inner wall 118 of gripping element 117, until gripping collar 114 is positioned upon seating ledge 119. When rotary cutting tool 113 is properly seated within gripping element 117 within cleaning tank 110, cutting portion 115 and cutting tip 116 will be operably immersed in, for example, ultrasonic cleaning fluid 120. Contact between cutting portion 115 of rotary cutting tool 113 and internal wall 118 of gripping element 117 is avoided during reciprocation of tool 113 as a result of internal wall 118 having a diameter only nominally greater than the outer diameter of gripping collar 114. When rotary cutting tool 113 is slidably pushed into gripping element 117 of cleaning tank 110, the gripping collar 114 keeps the entire tool 113 safely centered between the walls 118 of the gripping element, as well as with respect to the internal walls of apparatus housing 112.

Gripping collar 121 may likewise be mechanically removed and retracted together with rotary cutting tool 130, from gripping element 122 in cleaning tank 110. Protective deployment apparatus 111 can be reinserted over the shank portion of rotary cutting tool 130 and repositioned over gripping element 122. By applying pressure to the top surface of apparatus housing 80, while simultaneously grasping and pulling the exposed shank portion of rotary cutting tool 130, which is located above the exposure aperture of apparatus housing 80, rotary cutting tool 130 can be slidably retracted back into protective deployment apparatus 111, where gripping collar 121 is in restrained abutment with the upper ceiling of the interior area of apparatus housing 112. Tool protection apparatus 111, complete with rotary cutting tool 130, can then be detached from gripping element 122, and in turn, cleaning tank 110, for storage and/or shipment of the tool, while protecting the cutting region 125 and cutting tip 126 of rotary cutting tool 130.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A protective deployment apparatus for rotary cutting tools having shank and cutting portions for housing and shielding the cutting portion of such cutting tools during shipment and storage and for facilitating the deployment, installation and removal of said rotary cutting tool housed therewithin into conventional gripping elements of machine tool and rotary cutting tool processing equipment, in which said protective deployment apparatus cooperates to alternatively grip and release said tool through cooperation with a conventional gripping collar member radially deployed about the shank portion of said rotary cutting tool, said protective deployment apparatus comprising:

substantially cylindrically shaped tool housing means, having a first end and second end opposite to said first end, for enclosing the cutting portion of said rotary cutting tool when said tool is in a first retracted position;

tool collar gripping means operably positioned within said tool housing means for restrainably and releaseably fixing the position of said gripping collar member and, in turn, the rotary cutting tool affixed therewithin, in position within said tool housing means in said first retracted position;

shank exposure means positioned at said first end of said tool housing means for exposing the shank portion of said cutting tool;

said shank exposure means cooperating with said tool collar gripping means to permit said shank portion, and in turn, said rotary cutting tool, to be operably reciprocated between said first retracted position and a second extended position in which said cutting portion of said cutting tool passes through and out of said second end of said tool housing means with said gripping collar member being released from fixation within said tool collar gripping means;

said tool collar gripping means serving to align said gripping collar with said conventional gripping elements of said machine tool and rotary cutting tool processing equipment, in said first retracted position, for release of said gripping collar therefrom upon said reciprocation of said rotary cutting tool into said second extended position, to enable restrained receipt of said gripping collar by said conventional gripping elements upon deployment of said rotary cutting tool to said fully extended position, for use of said cutting tool and conventional gripping elements in said machine tool and rotary cutting tool processing equipment.

2. The protective deployment apparatus according to claim 1 in which the invention further includes tool retrieving means for accepting and repositioning said gripping collar member, and in turn, said rotary cutting tool from said second extended position within said conventional gripping elements to said first retracted position within said substantially cylindrically shaped tool housing means, said retrieving means including the shank portion of said rotary cutting tool extending beyond said shank exposure means of said substantially cylindrically shaped tool housing means, serving while in said extended position to enable alignment of said rotary cutting tool therewith and to further enable operable reciprocation of said gripping collar member, and in turn, said rotary cutting tool, between said second extended position and said first retracted position, in which said gripping collar member about said rotary cutting tool is released from said conventional gripping elements, slidably aligned with said tool collar gripping means within said tool housing means and retracted into same to longitudinally isolate said cutting portion of said rotary cutting tool within said substantially cylindrically shaped tool housing means.

3. The invention according to claim 1 wherein said substantially cylindrically shaped tool housing means is of a longitudinal length at least as long as the longitudinal length of that portion of said rotary cutting tool contained therewithin said first retracted position so as to isolate said cutting portion therewithin from contact with other objects, when said tool is in said first retracted position.

4. The invention according to claim 1 in which said tool collar gripping means comprises an anular flange region within said tool housing means;

said anular flange region having an internal diameter approximately equal to the outer diameter of said gripping collar member so as to prompt an interference fit therebetween when said rotary cutting tool is in said first retracted position.

5. The invention according to claim 1 in which said tool collar gripping means comprises a concentrically positioned plurality of rib means within said tool housing means;

said plurality of rib members describing an internal diameter approximately equal to the outer diameter of said gripping collar member so as to prompt an interference fit therebetween when said rotary cutting tool is in said first retracted position.

6. The invention according to claim 5 in which one or more of said rib members includes corresponding prompting means operably positioned at the lower tip of said one or more rib members for facilitating the secured alignment, and, the alternative release and grasping of said gripping collar member, and, in turn, said rotary cutting tool, by said tool collar gripping means respectively from and into said first retracted position;

said prompting means in said one or more rib members operably expanding said conventional gripping elements upon operable engagement of said protective deployment apparatus with said conventional gripping elements to facilitate passage of said gripping collar member into and out of said conventional gripping elements;

said prompting means permitting contraction of said gripping element upon disengagement of said protective deployment apparatus from said conventional gripping elements.

7. The invention according to claim 6 in which said conventional gripping element comprises a conventional tanged gripping member;

said prompting means in said one or more rib members comprising a chamfered lower edge capable of prompting respectively, aligned ones of said tanged gripping members radially outwardly as said protective deployment apparatus is operably engaged with said conventional gripping elements;

said chamfered lower edge releasing said respectively aligned tanged gripping members to contract radially inwardly upon disengagement between said protective deployment apparatus and said gripping elements.

8. The invention according to claim 1 wherein said conventional gripping elements for use in said conventional machine tool and rotary cutting tool processing equipment comprises a cylindrical grip member having a plurality of alternatively expandable and contractible tang means for alternative receipt and release of said gripping collar member upon reciprocation of said rotary cutting tool between said extended and retracted positions respectively.

9. The invention according to claim 1 wherein said conventional gripping element for use in said conventional machine tool and rotary cutting tool processing equipment comprises a cylindrical grip member for alternative receipt and release of said gripping collar member, upon reciprocation of said rotary cutting tool between said extended and retracted positions respectively.

10. The invention according to claim 1 wherein said rotary cutting tool processing equipment comprises rotary cutting tool reconditioning means for sharpening at least some of said cutting portion of said rotary cutting tool.

11. The invention according to claim 1 wherein said rotary cutting tool processing equipment comprises an ultrasonic cleaning apparatus for cleaning at least some of said cutting portion of said rotary cutting tool.

12. The protective deployment apparatus according to claim 1 in which the invention further comprises pressure application surface means operably positioned and emanating outwardly from outer periphery of said top surface of said first end of said substantially cylindrically shaped tool housing means, for facilitating vertical engagement and restraint of said protective deployment apparatus relative to said conventional gripping elements prior to and during reciprocation of said rotary cutting tool between said first retracted position and said second extended position.

13. The invention according to claim 12 in which said pressure application surface means comprises obliquely angled pressure regions relative to said top surface of said end of said substantially cylindrically shaped tool housing means, for ease in asserting manual pressure thereto.

14. The invention according to claim 13 in which said obliquely angled pressure regions are further embossed with tactile gripping ridges.

15. The protective deployment apparatus according to claim 1 wherein the invention further comprises pullback means operably secured to said outer periphery of said substantially cylindrically shaped tool housing means to facilitate the vertical removal and release of said protective deployment apparatus from said conventional gripping elements.

16. The invention according to claim 15 wherein said pullback means comprise obliquely angled pullback regions relative to the longitudinal walls of said tool housing means, for ease and applying manual pressure thereto.

17. The invention according to claim 16 in which said obliquely angled pullback regions are further embossed with tactile gripping ridges.

18. The protective deployment apparatus according to claim 1 wherein the invention further comprises knurling means operably applied to the outer periphery of the longitudinal walls of said substantially cylindrically shaped tool housing means for facilitated manual manipulation and restraint.

19. The invention according to claim 1 in which the longitudinal walls of said tool housing means are flared outwardly proximate to said second end to facilitate engagement of same with said conventional gripping elements.

20. The invention according to claim 1 in which said shank exposure means includes a chamfered edge positioned therebelow to facilitate the slidable positioning of the top of said shank portion of said rotary cutting tool through said shank exposure means.

21. The invention according to claim 1 in which the invention further includes indicia means operably and visibly applied to the longitudinal walls of said substantially cylindrically shaped tool housing means to facilitate the identification of structural specifications of the rotary cutting tool contained therewithin.

* * * * *

UNITED STATES PATENT AND TRADEMARK OFFICE
CERTIFICATE OF CORRECTION

PATENT NO. : 4,811,843

DATED : March 14, 1989

INVENTOR(S) : John J. Stribiak

It is certified that error appears in the above-identified patent and that said Letters Patent is hereby corrected as shown below:

Col. 3, line 37　　　　　After the first occurrence of "means" insert -- . --

Col. 9, line 60　　　　　After "pressure" delete "35"

Col. 11, line 55　　　　After "130" insert -- , --

Signed and Sealed this

Seventeenth Day of April, 1990

Attest:

HARRY F. MANBECK, JR.

Attesting Officer　　　Commissioner of Patents and Trademarks